(12) United States Patent
Fudge et al.

(10) Patent No.: US 7,376,243 B2
(45) Date of Patent: May 20, 2008

(54) APPARATUS AND METHOD FOR WATERMARKING A DIGITAL IMAGE

(75) Inventors: Brian Fudge, San Diego, CA (US); Kadayam Thyagarajan, San Diego, CA (US); Eric Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/341,098

(22) Filed: Jan. 27, 2006

(65) Prior Publication Data

US 2006/0120562 A1 Jun. 8, 2006

Related U.S. Application Data

(63) Continuation of application No. 09/881,017, filed on Jun. 13, 2001, now Pat. No. 6,996,248.

(51) Int. Cl.
*G06K 9/00* (2006.01)
(52) U.S. Cl. .................. 382/100; 380/203; 380/210; 380/268; 382/238; 388/94; 388/95
(58) Field of Classification Search ............. 380/210, 380/217; 382/100, 236, 284; 713/176, 179; 300/203, 210, 217, 268; 386/94, 95
See application file for complete search history.

(56) References Cited

U.S. PATENT DOCUMENTS 5,021,891 A 6/1991 Lee
5,107,345 A 4/1992 Lee
5,452,104 A 9/1995 Lee
5,646,997 A 7/1997 Barton
6,018,374 A 1/2000 Wrobleski
6,208,745 B1 * 3/2001 Florencio et al. ........... 382/100
6,345,100 B1 * 2/2002 Levine ........................ 380/205

(Continued)

FOREIGN PATENT DOCUMENTS

EP  0884908  12/1998

(Continued)

OTHER PUBLICATIONS

Langelaar G C et al., "Watermarking Digital Image and Video Data," IEEE Signal Processing Magazine, IEEE Inc., New York, US, vol. 17, No. 5, 2000-09, pp. 20-46.

(Continued)

*Primary Examiner*—Gregory Desire
(74) *Attorney, Agent, or Firm*—Milan Patel; Steven Thiel; Thomas R. Rouse

(57) ABSTRACT

An apparatus for adding a watermark to a moving image as it is displayed comprises a watermark generator in which data representing a watermark is generated. The watermark contains at least one of location data and time data pertaining to the displaying of the moving image. The location and time data is protected by forward error encoding. The watermark also contains at least one of program data identifying the moving image and frame data unique in identifying each frame of the moving image. The program and time data is protected by scrambling. A watermark applicator applies the watermark data to image data representing substantially all of the moving image depending on a characteristic, such as amplitude, of the data.

16 Claims, 6 Drawing Sheets

U.S. PATENT DOCUMENTS

| | | | |
|---|---|---|---|
| 6,598,162 B1* | 7/2003 | Moskowitz | 713/176 |
| 6,614,914 B1* | 9/2003 | Rhoads et al. | 382/100 |
| 6,625,297 B1 | 9/2003 | Bradley | |
| 6,633,723 B1* | 10/2003 | Kuroda et al. | 386/94 |
| 6,671,376 B1* | 12/2003 | Koto et al. | 380/210 |
| 6,850,619 B1 | 2/2005 | Hirai | |
| 6,865,675 B1 | 3/2005 | Epstein | |
| 6,885,757 B2 | 4/2005 | Bloom et al. | |
| 6,928,165 B1* | 8/2005 | Takai | 380/201 |
| 6,985,589 B2 | 1/2006 | Morley et al. | |
| 6,996,248 B2* | 2/2006 | Fudge et al. | 382/100 |
| 7,058,979 B1* | 6/2006 | Baudry et al. | 726/32 |
| 2002/0056081 A1 | 5/2002 | Morley et al. | |
| 2003/0026422 A1* | 2/2003 | Gerheim et al. | 380/210 |
| 2006/0120562 A1* | 6/2006 | Fudge et al. | 382/100 |
| 2006/0133644 A1* | 6/2006 | Wells et al. | 382/100 |
| 2006/0239503 A1* | 10/2006 | Petrovic et al. | 382/100 |

FOREIGN PATENT DOCUMENTS

| | | |
|---|---|---|
| WO | 99044306 | 9/1999 |
| WO | 9959335 | 11/1999 |
| WO | 0152181 | 7/2001 |

OTHER PUBLICATIONS

Cox I J et al., "Secure Spread Spectrum Watermarking for Multimedia," IEEE Transactions on Image Processing, IEEE Inc. New York, US, vol. 6, No. 12, Dec. 12, 1997, pp. 1673-1687.

Frank Hartung and Bernd Girod, "Fast Public-Key Watermarking of Compressed Video" Imaging Processing, 1997, International Conference on vol. 1, Oct. 26-29, 1997 pp. 528-521 vol. 1.

International Serach Report, PCT/US02/18960, International Search Authority, European Patent Office, Jan. 7, 2003.

Jaap Haitsma and Ton Kalker, "A Watermarking Scheme for Digital Cinema" Image Processing, 2001 International Conference on vol. 2, Oct. 7-10, 2001 pp. 487-489 vol. 2.

* cited by examiner

APPARATUS AND METHOD FOR WATERMARKING A DIGITAL IMAGE

CLAIM OF PRIORITY UNDER 35 U.S.C. §120

The present Application for Patent is a continuation and claims priority to patent application Ser. No. 09/881,017, now U.S. Pat. No. 6,996,248, entitled "APPARATUS AND METHOD FOR WATERMARKING A DIGITAL IMAGE" filed Jun. 13, 2001, and assigned to the assignee hereof and hereby expressly incorporated by reference herein.

BACKGROUND OF THE INVENTION

I. Field of the Invention

The present invention relates to a method and apparatus for watermarking a digital image. The invention may be usefully employed in the newly emerging field of digital cinema.

II. Description of the Related Art

In the traditional film industry, theatre operators receive reels of celluloid film from a studio or through a distributor for eventual presentation in a theatre auditorium. The reels of film include the feature program (a full-length motion picture) and a plurality of previews and other promotional material, often referred to as trailers. This approach is well established and is based in technology going back around one hundred years.

Recently an evolution has started in the film industry, with the industry moving from celluloid film to digitized image and audio programs. Many advanced technologies are involved and together those technologies are becoming known as digital cinema. It is planned that digital cinema will provide a system for delivering full length motion pictures, trailers, advertisements and other audio/visual programs comprising images and sound at "cinema-quality" to theatres throughout the world using digital technology. Digital cinema will enable the motion picture cinema industry to convert gracefully from the century-old medium of 35 mm film into the digital/wireless communication era of today. This advanced technology will benefit all segments of the movie industry.

The intention is that digital cinema will deliver motion pictures that have been digitized, compressed and encrypted to theatres using either physical media distribution (such as DVD-ROMs) or electronic transmission methods, such as via satellite multicast methods. Authorized theatres will automatically receive the digitized programs and store them in hard disk storage while still encrypted and compressed. At each showing, the digitized information will be retrieved via a local area network from the hard disk storage, be decrypted, decompressed and then displayed using cinema-quality electronic projectors featuring high quality digital sound.

Digital cinema will encompass many advanced technologies, including digital compression, electronic security methods, network architectures and management, transmission technologies and cost-effective hardware, software and integrated circuit design. The technologies necessary for a cost-effective, reliable and secure system are being analyzed and developed. These technologies include new forms of image compression, because most standard compression technologies, such as MPEG-2, are optimized for television quality. Thus, artifacts and other distortions associated with that technology show up readily when the image is projected on a large screen. Whatever the image compression method adopted, it will affect the eventual quality of the projected image. Special compression systems have therefore been designed specifically for digital cinema applications to provide "cinema-quality" images at bit rates averaging less than 40 Mbps. Using this technology a 2-hour movie will require only about 40 GB of storage, making it suitable for transportation on such media as so-called digital versatile disks (DVDs) or transmission or broadcast via a wireless link.

While this has obvious advantages in terms of the distribution of movies, it brings with it its own problems in that in itself such transportation and transmission is not secure. Encryption and conditional access methods are therefore also being developed with the aim of preventing piracy of movies. In addition to digital theft, i.e., the theft of a pristine digital copy of the content of the DVDs and/or transmitted data, there is also the problem of optical theft. Optical theft is the recording of the image and audio content of a movie as it is being projected onto the screen of a theater. Optical theft is easy to perform using, for example, little more than a camcorder.

SUMMARY OF THE INVENTION

While there is no sure way of preventing digital or optical theft, it is possible to reduce the likelihood of it occurring by increasing the probability of the perpetrators of the theft being caught. The invention addresses the above-discussed problems associated with digital cinema and is useful in overcoming or at least reducing the problem of digital and optical theft. To this end the invention aims to provide a method and apparatus for inserting an imperceptible watermark or "digital fingerprint" into the image content. The watermark preferably indicates at least one of the location, date and time of showing of the movie, thereby enabling the location date and time of the theft to be determined.

Although the foregoing introduction and following description concentrate on the insertion of a watermark into an image as the movie is being shown (thereby enabling both optical and digital theft at the theater to be tracked), it will be appreciated by those possessed of the appropriate skills that the same technique could equally well be used in a telecine when original film is converted into digital form (thereby enabling digital and optical theft outside the theater to be tracked). The watermark might for example identify any one or more of the location, date and time of creation of the digital version of the film, the film owner's identity, or copyright information. The technique is applicable to still images as well as moving images.

According to one aspect of the invention, there is provided an apparatus for applying data representing a watermark to data representing an image, the apparatus comprising: a source of location and time data; an error coding unit connected to receive the location and time data for applying a forward error correction algorithm to the said location and time data and outputting error coded data therefrom; a code spreading unit connected to receive the error coded data for spreading the error coded data to create spread data by repeatedly outputting portions of the error coded data a number of times therefrom; a DES code generator for generating and outputting data representing a DES code; a combiner for combining the spread data and the DES code and outputting watermark data representing a location and time specific watermark; a receiver for receiving signals containing said data representing an image as DCT coefficients in transform space, which data is received in an encoded and compressed form on a signal medium, and for receiving an apparatus specific key; a decoding circuit responsive to the apparatus specific key for decoding and decompressing the received signals to recover the data representing an image therefrom; a control circuit for analyzing at least a component of the image data to determine an attribute thereof and to output a signal representative of the attribute; a marking control unit, connected to receive the signal from the control circuit, the image data from the source and the watermark data from the combiner, for adding the watermark data to the image data depending on a characteristic of the attribute and a characteristic of the image data; an inverse DCT transform circuit connected to receive the watermarked image data and to convert the same from data representing the image as DCT coefficients in transformation space to data representing the image in pixel space; a pixel processor connected to receive the data representing the image in pixel space for converting the pixel data into a format suitable for display; and a projector connected to receive formatted pixel data from the pixel processor for projecting the image represented thereby.

According to another aspect of the invention there is provided an apparatus for applying data representing a watermark to data representing an image, the apparatus comprising: means for supplying location and time data; means for receiving the location and time data, for applying error coding to the said location and time data, and outputting error coded data therefrom; spreading means connected to receive the error coded data for applying a spreading function to the error coded data and outputting spread data therefrom; means for generating and outputting data representing a pseudo-random code; means for combining the spread data and the pseudo-random code and outputting watermark data representing a location and time specific watermark; means for supplying image data representing an image in transformation space; means for analyzing at least a component of the image data to determine an attribute thereof and for outputting a signal representative of the attribute; and marking means, connected to receive the signal representative of the attribute, the image data and the watermark data, for adding the watermark data to the image data depending on a characteristic of the attribute and a characteristic of the image data.

According to a further aspect of the invention there is provided a method of applying data representing a watermark to data representing an image, the method comprising: supplying location and time data; applying a forward error correction algorithm to the said location and time data to produce error coded data; applying a spreading function to the error coded data to create spread data by repeating portions of the error coded data a number of times; generating data representing a DES code; combining the spread data and the DES code to create watermark data representing a location and time specific watermark; receiving signals containing said data representing an image as DCT coefficients in transform space, which data is received in an encoded and compressed form on a signal medium; receiving an apparatus specific key; decoding and decompressing the received signals responsive to the apparatus specific key to recover the data representing an image therefrom; analyzing at least a component of the image data to determine an attribute thereof and to create a signal representative of the attribute; adding the watermark data to the image data depending on a characteristic of the attribute and a characteristic of the image data; and converting the watermarked image data from data representing the image as DCT coefficients in transformation space to data representing the image in pixel space; converting the pixel data into a format suitable for display, and projecting the image represented by the formatted pixel data.

According to another aspect of the invention there is provided a method of applying data representing a watermark to data representing an image, the method comprising: supplying location and time data; applying error coding to the said location and time data to produce error coded data; applying a spreading function to the error coded data to produce spread data; generating data representing a pseudo-random code; combining the spread data and the pseudo-random code to produce watermark data representing a location and time specific watermark; supplying image data representing an image in transformation space; analyzing at least a component of the image data to determine an attribute thereof to produce a signal representative of the attribute; and adding the watermark data to the image data depending on a characteristic of the attribute and a characteristic of the image data.

The invention also provides an apparatus for adding a watermark to a moving image as it is displayed, the apparatus comprising: a watermark generator in which data representing a watermark is generated containing first information pertaining to the displaying of the moving image and protected by forward error encoding and second information pertaining to the displaying of the moving image and protected by scrambling; and a watermark applicator for applying the watermark data to image data representing substantially all of the moving image depending on a characteristic of the data.

The invention further provides a watermarking system for applying data representing a moving image to produce watermarked image data which is output to a display device for display of the moving image represented thereby, in which system information identifying at least one of the system, the image and the displaying of the image is convolutionally encoded and spread and information identifying at least one of the system, the image and the displaying of the image is encrypted so as to produce the watermark data which is applied to substantially all data representing the moving image with the exception of data having a value below a determined level in order to minimize the introduction of visible noise and other artifacts into the image by the watermark.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings, in which:

DETAILED DESCRIPTION OF AN EMBODIMENT OF THE INVENTION

The following description is intended to provide both an overview of a digital cinema system in which the invention may be embodied and a detailed disclosure of the presently preferred embodiment itself. Systems similar to the system shown herein are described extensively in other applications assigned to the assignee of this application, including U.S. Ser. No. 09/564,174, entitled, "Apparatus And Method For Encoding And Storage Of Digital Image And Audio Signals" and U.S. Ser. No. 09/563,880, entitled, "Apparatus And Method For Decoding Digital Image And Audio Signals" both filed May 3, 2000, the teachings of which are incorporated herein by reference.

Figure 1:
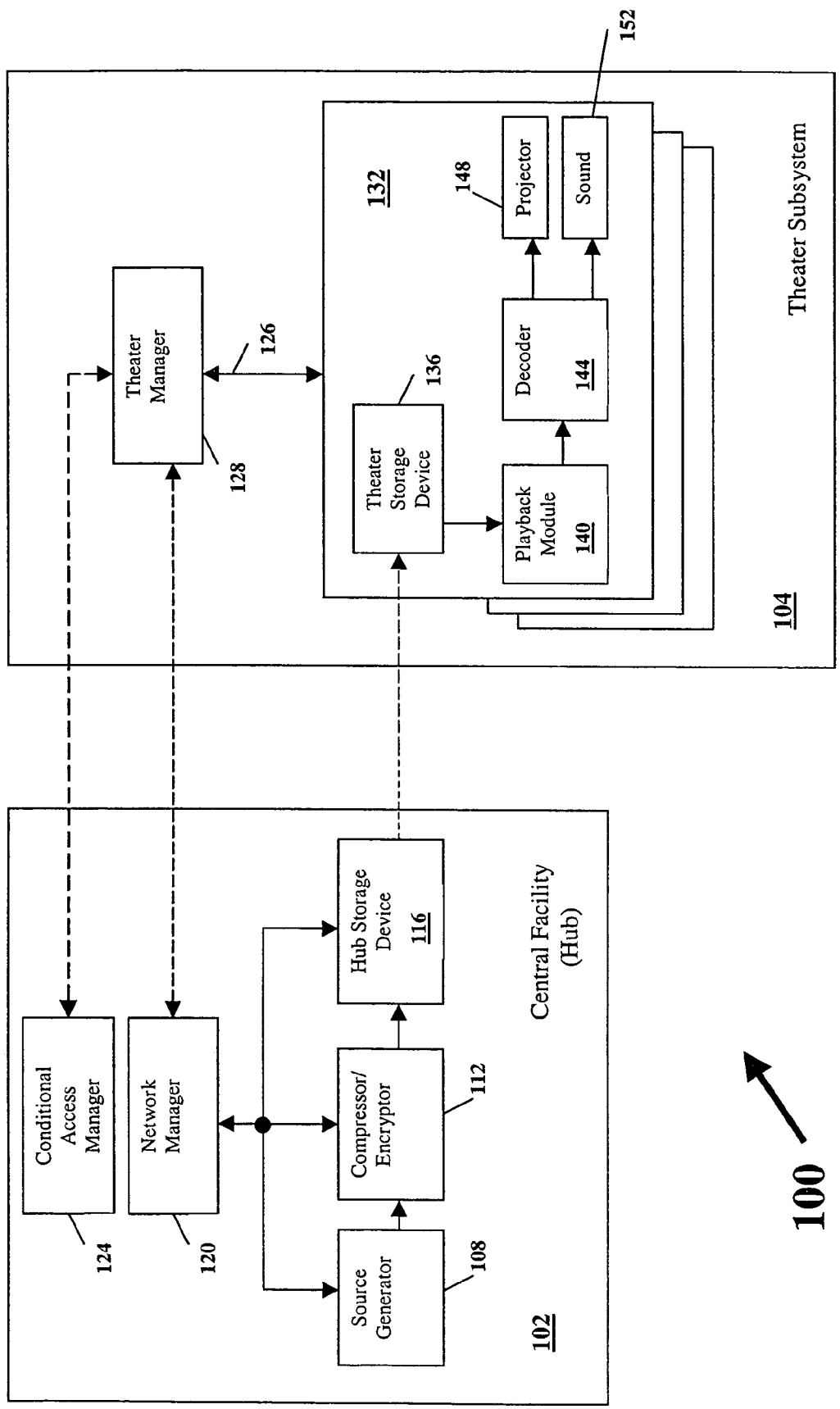
FIG. 1 illustrates a block diagram of a digital cinema system.

A digital cinema system 100 embodying the invention is illustrated in FIG. 1 of the accompanying drawings. The digital cinema system 100 comprises two main systems: at least one central facility or hub 102 and at least one presentation or theater subsystem 104. The hub 102 and the theater subsystem 104 are of a similar design to that of pending U.S. patent application Ser. No. 09/075,152, filed on May 8, 1998, assigned to the same assignee as the present invention, the teachings of which are incorporated herein by reference.

Image and audio information are compressed and stored on a storage medium, and distributed from the hub 102 to the theater subsystem 104. Generally, one theater subsystem 104 is utilized for each theater or presentation location in a network of presentation locations that is to receive image or audio information, and includes some centralized equipment as well as certain equipment employed for each presentation auditorium.

In the central hub 102, a source generator 108 receives film material and generates a digital version of the film. The digital information is compressed and encrypted by a compressor/encryptor (CE) 112, and stored on a storage medium by a hub storage device 116. A network manager 120 monitors and sends control information to the source generator 108, the CE 112, and the hub storage device 116. A conditional access manager 124 provides specific electronic keying information such that only specific theaters are authorized to show specific programs.

In the theater subsystem 104, a theater manager 128 controls an auditorium module 132. Based on control information received from the auditorium module 132, a theater storage device 136 transfers compressed information stored on the storage medium to a playback module 140. The playback module 140 receives the compressed information from the theater storage device 136, and prepares the compressed information to a predetermined sequence, size and data rate. The playback module 140 outputs the compressed information to a decoder 144. The decoder 144 inputs compressed information from the playback module 140 and performs decryption, decompression and formatting, and outputs the information to a projector 148 and a sound module 152. The projector 148 plays the information on a projector and the sound module 152 plays sound information on a sound system, both under control of the auditorium module 132.

In operation, the source generator 108 provides digitized electronic image and/or programs to the system. Typically, the source generator 108 receives film material and generates a magnetic tape containing digitized information or data. The film is digitally scanned at a very high resolution to create the digitized version of the motion picture or other program. Typically, a known "telecine" process generates the image information while well-known digital audio conversion processing generates the audio portion of the program. The images being processed need not be provided from a film, but can be single picture or still frame type images, or a series of frames or pictures, including those shown as motion pictures of varying length. These images can be presented as a series or set to create what are referred to as image programs. In addition, other material can be provided such as visual cue tracks for sight-impaired audiences, subtitling for foreign language and/or hearing impaired audiences, or multimedia time cue tracks. Similarly, single or sets of sounds or recordings are used to form desired audio programs.

Alternatively, a high definition digital camera or other known digital image generation device or method may provide the digitized image information. The use of a digital camera, which directly produces the digitized image information, is especially useful for live event capture for substantially immediate or contemporaneous distribution. Computer workstations or similar equipment can also be used to directly generate graphical images that are to be distributed.

The digital image information or program is presented to the compressor/encryptor 112, which compresses the digital signal using a preselected known format or process, reducing the amount of digital information necessary to reproduce the original image with very high quality. Preferably, an ABSDCT technique is used to compress the image source. A suitable ABSDCT compression technique is disclosed in U.S. Pat. Nos. 5,021,891, 5,107,345, and 5,452,104, the teachings of which are incorporated herein by reference. The audio information may also be digitally compressed using standard techniques and may be time synchronized with the compressed image information. The compressed image and audio information is then encrypted and/or scrambled using one or more secure electronic methods.

The network manager 120 monitors the status of compressor/encryptor 112, and directs the compressed information from the compressor/encryptor 112 to the hub storage device 116. The hub storage device 116 is comprised of one or more storage. The storage medium/media may be any type of high capacity data storage device including, but not limited to, one or more digital versatile disks (DVDs) or removable hard drives (RHDs). Upon storage of the compressed information onto the storage medium, the storage medium is physically transported to the theater subsystem 104, and more specifically, to the theater storage device 136.

Alternatively, the compressed image and audio information may each be stored in a non-contiguous or separate manner independent of each other. That is, a means is provided for compressing and storing audio programs associated with image information or programs but segregated in time. There is no requirement to process the audio images at the same time. A predefined identifier or identification mechanism or scheme is used to associate corresponding audio and image programs with each other, as appropriate. This allows linking of one or more preselected audio programs with at least one preselected image program, as desired, at a time of presentation, or during a presentation event. That is, while not initially time synchronized with the compressed image information, the compressed audio is linked and synchronized at presentation of the program.

Further, maintaining the audio program separate from the image program allows for synchronizing multiple languages from audio programs to the image program, without having to recreate the image program for each language. Moreover, maintaining a separate audio program allows for support of multiple speaker configurations without requiring interleaving of multiple audio tracks with the image program.

In addition to the image program and the audio program, a separate promotional program, or promo program, may be added to the system. Typically, promotional material changes at a greater frequency than the feature program. Use of a separate promo program allows promotional material to be updated without requiring new feature image programs. The promo program comprises information such as advertising (slides, audio, motion or the like) and trailers shown in the theater. Because of the high storage capacity of storage media such as DVDs and RHDs, thousands of slides or pieces of advertising may be stored. The high storage volume allows for customization, as specific slides, advertisements or trailers may be shown at specific theaters to targeted customers.

Although FIG. 1 illustrates the compressed information in the storage device 116 and physically transporting storage medium/media to the theater subsystem 104, it should be understood that the compressed information, or portions thereof, may be transmitted to the theater storage device 136 using any of a number wireless or wired transmission methods. Transmission methods include satellite transmission, well-known multi-drop, Internet access nodes, dedicated telephone lines, or point-to-point fiber optic networks.

Figure 2:
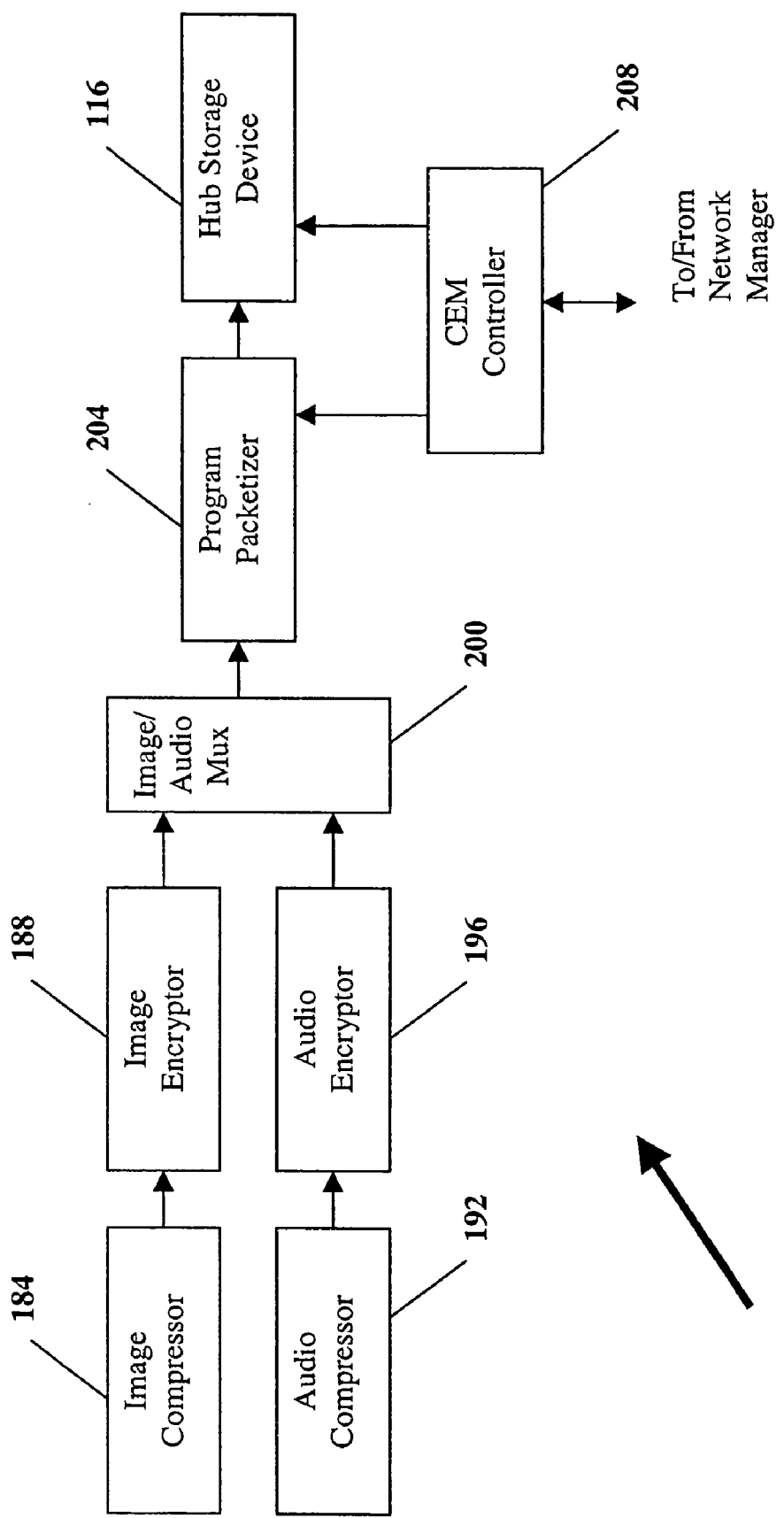
FIG. 2 is a block diagram of a compressor/encryptor circuit used in the system of FIG. 1.

A block diagram of the compressor/encryptor 112 is illustrated in FIG. 2 of the accompanying drawings. Similar to the source generator 108, the compressor/encryptor 112 may be part of the central hub 102 or located in a separate facility. For example, the compressor/encryptor 112 may be located with the source generator 108 in a film or television production studio. In addition, the compression process for either image or audio information or data may be implemented as a variable rate process.

The compressor/encryptor 112 receives a digital image and audio information provided by the source generator 108. The digital image and audio information may be stored in frame buffers (not shown) before further processing. The digital image signal is passed to an image compressor 184. In a preferred embodiment, the image compressor 184 processes a digital image signal using the ABSDCT technique described in the abovementioned U.S. Pat. Nos. 5,021,891, 5,107,345, and 5,452,104.

In the ABSDCT technique, the color input signal is generally in a YIQ format, with Y being the luminance, or brightness, component, and I and Q being the chrominance, or color, components. Other formats such as the YUV, $YC_bC_r$, or RGB formats may also be used. Because of the low spatial sensitivity of the eye to color, the ABSDCT technique sub-samples the color (I and Q) components by a factor of two in each of the horizontal and vertical directions. Accordingly, four luminance components and two chrominance components are used to represent each spatial segment of image input. The ABS DCT Technique also supports a format called 4:4:4 where no nonsampling of chrominance component takes place. Pixels in each component are represented digitally in up to 10 bits linear or log scale.

Each of the luminance and chrominance components is passed to a block interleaver. Generally, a 16×16 block is presented to the block interleaver, which orders the image samples within the 16×16 blocks to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. Preferably, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block. Then, the block or the combination of sub-blocks, which requires the least number of bits to encode, is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order. The DCT coefficient values may then undergo further processing such as, but not limited to, frequency weighting, quantization, and coding (such as variable length coding) using known techniques, in preparation for transmission. The compressed image signal is then provided to at least one image encryptor 188.

The digital audio signal is generally passed to an audio compressor 192. Preferably, the audio compressor 192 processes multi-channel audio information using a standard digital audio compression algorithm. The compressed audio signal is provided to at least one audio encryptor 196. Alternatively, the audio information may be transferred and utilized in an uncompressed, but still digital, format.

The image encryptor 188 and the audio encryptor 196 encrypts the compressed image and audio signals, respectively, using any of a number of known encryption techniques. The image and audio signals may be encrypted using the same or different techniques. In a preferred embodiment, an encryption technique, which comprises real-time digital sequence scrambling of both image and audio programming, is used.

At the image and audio encryptors 188 and 196, the programming material is processed by a scrambler/encryptor circuit that uses time-varying electronic keying information (typically changed several times per second). The scrambled program information can then be stored or transmitted, such as over the air in a wireless link, without being decipherable to anyone who does not possess the associated electronic keying information used to scramble the program material or digital data.

Encryption generally involves digital sequence scrambling or direct encryption of the compressed signal. The words "encryption" and "scrambling" are used interchangeably and are understood to mean any means of processing digital data streams of various sources using any of a number of cryptographic techniques to scramble, cover, or directly encrypt said digital streams using sequences generated using secret digital values ("keys") in such a way that it is very difficult to recover the original data sequence without knowledge of the secret key values.

Each image or audio program may use specific electronic keying information which is provided, encrypted by presentation-location or theater-specific electronic keying information, to theaters or presentation locations authorized to show that specific program. The conditional access manager (CAM) 124 handles this function. The encrypted program key needed by the auditorium to decrypt the stored information is transmitted, or otherwise delivered, to the authorized theaters prior to playback of the program. Note that the stored program information may potentially be transmitted days or weeks before the authorized showing period begins, and that the encrypted image or audio program key may be transmitted or delivered just before the authorized playback period begins. The encrypted program key may also be transferred using a low data rate link, or a transportable storage element such as a magnetic or optical media disk, a smart card, or other devices having erasable memory elements. The encrypted program key may also be provided in such a way as to control the period of time for which a specific theater complex or auditorium is authorized to show the program.

Each theater subsystem 104 that receives an encrypted program key decrypts this value using its auditorium specific key, and stores this decrypted program key in a memory device or other secured memory. When the program is to be played back, the theater or location specific and program specific keying information is used, preferably with a symmetric algorithm, that was used in the encryptor 112 in preparing the encrypted signal to now descramble/decrypt program information in real-time.

Returning now to FIG. 2, in addition to scrambling, the image encryptor 188 may add a "watermark" or "fingerprint" which is usually digital in nature, to the image programming. This involves the insertion of a location specific and/or time specific visual identifier into the program sequence. That is, the watermark is constructed to indicate the authorized location and time for presentation, for more efficiently tracking the source of illicit copying when necessary. The watermark may be programmed to appear at frequent, but pseudo-random periods in the playback process and would not be visible to the viewing audience. The watermark is perceptually unnoticeable during presentation of decompressed image or audio information at what is predefined as a normal rate of transfer. However, the watermark is detectable when the image or audio information is presented at a rate substantially different from that normal rate, such as at a slower "non-real-time" or still frame playback rate. If an unauthorized copy of a program is recovered, the digital watermark information can be read by authorities, and the theater from which the copy was made can be determined. Such a watermark technique may also be applied or used to identify the audio programs.

The compressed and encrypted image and audio signals are both presented to a multiplexer 200. At the multiplexer 200, the image and audio information is multiplexed together along with time synchronization information to allow the image and audio-streamed information to be played back in a time aligned manner at the theater subsystem 104. The multiplexed signal is then processed by a program packetizer 204, which packetizes the data to form the program stream. By packetizing the data, or forming "data blocks," the program stream may be monitored during decompression at the theater subsystem 104 (see FIG. 1) for errors in receiving the blocks during decompression. Requests may be made by the theater manager 128 of the theater subsystem 104 to acquire data blocks exhibiting errors. Accordingly, if errors exist, only small portions of the program need to be replaced, instead of an entire program. Requests of small blocks of data may be handled over a wired or wireless link. This provides for increased reliability and efficiency.

Alternatively, the image and audio portions of a program are treated as separate and distinct programs. Thus, instead of using the multiplexer 200 to multiplex the image and audio signals, the image signals are separately packetized. In this way the image program may be transported exclusive of the audio program, and vice versa. As such, the image and audio programs are assembled into combined programs only at playback time. This allows for different audio programs to be combined with image programs for various reasons, such as varying languages, providing post-release updates or program changes, to fit within local community standards, and so forth. This ability to flexibly assign audio different multi-track programs to image programs is very useful for minimizing costs in altering programs already in distribution, and in addressing the larger multi-cultural markets now available to the film industry.

The compressors 184 and 192, the encryptors 188 and 196, the multiplexer 200, and the program packetizer 204 may be implemented by a compression/encryption module (CEM) controller 208, a software-controlled processor programmed to perform the functions described herein. That is, they can be configured as generalized function hardware including a variety of programmable electronic devices or computers that operate under software or firmware program control. They may alternatively be implemented using some other technology, such as through an ASIC or through one or more circuit card assemblies, i.e., constructed as specialized hardware.

The image and audio program stream is sent to the hub storage device 116. The CEM controller 208 is primarily responsible for controlling and monitoring the entire compressor/encryptor 112. The CEM controller 208 may be implemented by programming a general-purpose hardware device or computer to perform the required functions, or by using specialized hardware. Network control is provided to CEM controller 208 from the network manager 120 (FIG. 2) over a hub internal network, as described herein. The CEM controller 208 communicates with the compressors 184 and 192, the encryptors 188 and 196, the multiplexer 200, and the packetizer 204 using a known digital interface and controls the operation of these elements. The CEM controller 208 may also control and monitor the storage module 116, and the data transfer between these devices.

The storage device 116 is preferably constructed as one or more RHDs, DVDs disks or other high capacity storage medium/media, which in general is of similar design as the theater storage device 116 in theater subsystem 104. However, those skilled in the art will recognize that in some applications other media may be used including but not limited to DVDs (Digital Versatile Disks) or so-called JBODs ("Just a Bunch Of Drives"). The storage device 116 receives the compressed and encrypted image, audio, and control data from the program packetizer 204 during the compression phase. Operation of the storage device 116 is managed by the CEM controller 208.

Figure 3:
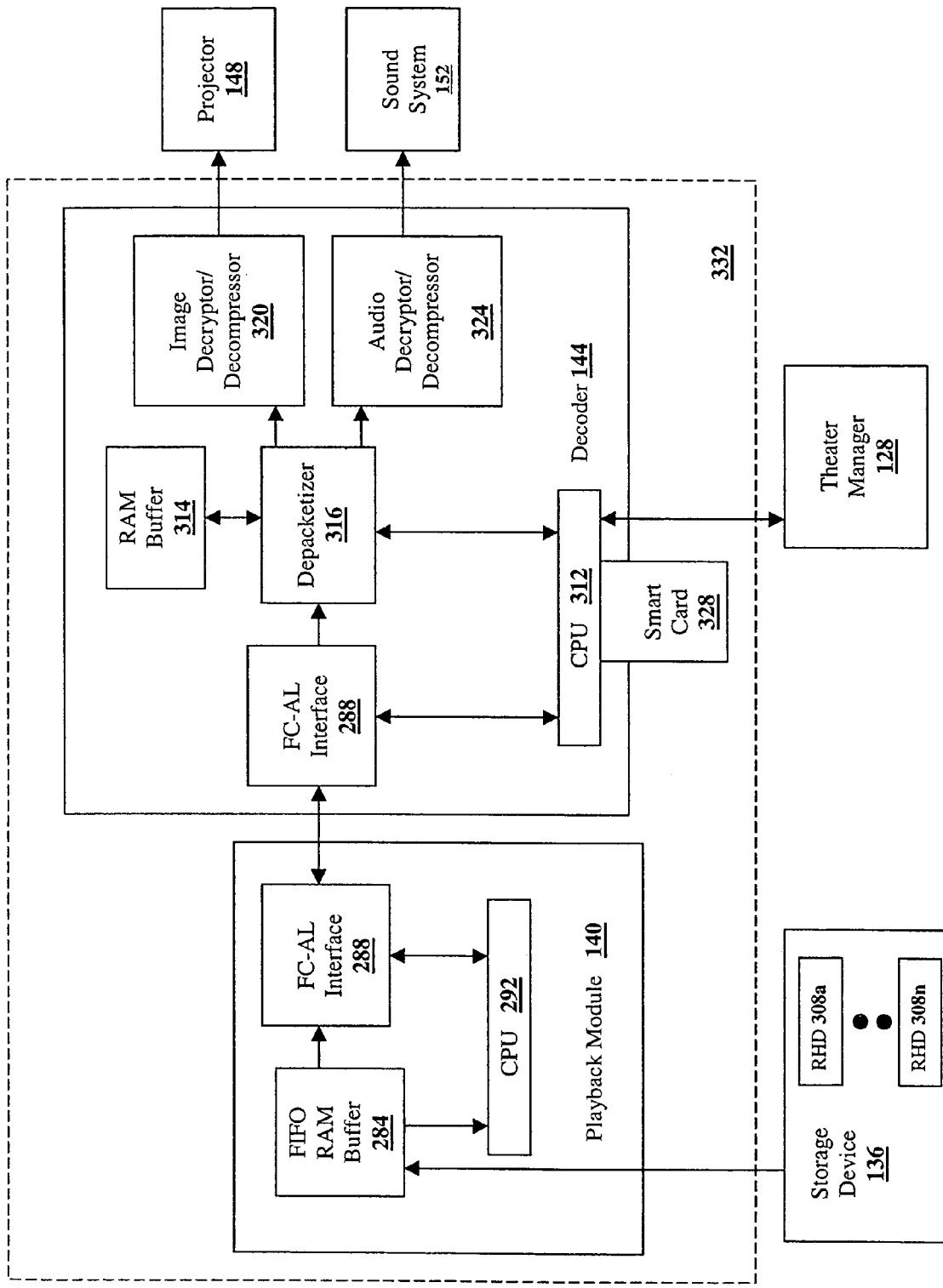
FIG. 3 illustrates an auditorium module used in the system of FIG. 1.

FIG. 3 of the accompanying drawings illustrates operation of the auditorium module 132 using one or more RHDs (removable hard drives) 308. For speed, capacity, and convenience reasons, it may be desirable to use more than one RHD 308*a* to 308*n*. When reading data sequentially, some RHDs have a "prefetching" feature that anticipates a following read command based upon a recent history of commands. This prefetching feature is useful in that the time required to read sequential information off the disk is reduced. However, the time needed to read non-sequential information off the disk may be increased if the RHD receives a command that is unexpected. In such a case, the prefetching feature of the RHD may cause the random access memory of the RHD to be full, thus requiring more time to access the information requested. Accordingly, having more than one RHD is beneficial in that a sequential stream of data, such as an image program, may be read faster. Further, accessing a second set of information on a separate RHD disk, such as audio programs, trailers, control information, or advertising, is advantageous in that accessing such information on a single RHD is more time consuming.

Thus, compressed information is read from one or more RHDs 308 into a buffer 284. The FIFO-RAM buffer 284 in the playback module 140 receives the portions of compressed information from the storage device 136 at a predetermined rate. The FIFO-RAM buffer 284 is of a sufficient capacity such that the decoder 144, and subsequently the projector 148, is not overloaded or under-loaded with information. Preferably, the FIFO-RAM buffer 284 has a capacity of about 100 to 200 MB. Use of the FIFO-RAM buffer 284 is a practical necessity because there may be a several second delay when switching from one drive to another.

The portions of compressed information is output from the FIFO-RAM buffer into a network interface 288, which provides the compressed information to the decoder 144. Preferably, the network interface 288 is a fiber channel arbitrated loop (FC-AL) interface. Alternatively, although not specifically illustrated, a switch network controlled by the theater manager 128 receives the output data from the playback module 140 and directs the data to a given decoder 144. Use of the switch network allows programs on any given playback module 140 to be transferred to any given decoder 144.

When a program is to be viewed, the program information is retrieved from the storage device 136 and transferred to the auditorium module 132 via the theater manager 128. The decoder 144 decrypts the data received from the storage device 136 using secret key information provided only to authorized theaters, and decompresses the stored information using the decompression algorithm which is inverse to the compression algorithm used at source generator 108. The decoder 144 includes a converter (not shown in FIG. 3) which converts the decompressed image information to an image display format used by the projection system (which may be either an analog or digital format) and the image is displayed through an electronic projector 148. The audio information is also decompressed and provided to the auditorium's sound system 152 for playback with the image program.

The decoder 144 will now be described in greater detail by further reference to FIG. 3. The decoder 144 processes a compressed/encrypted program to be visually projected onto a screen or surface and audibly presented using the sound system 152. The decoder 144 comprises a controlling CPU (central processing unit) 312, which controls the decoder. Alternatively, the decoder may be controlled via the theater manager 128. The decoder further comprises at least one depacketizer 316, a buffer 314, an image decryptor/decompressor 320, and an audio decryptor/decompressor 324. The buffer may temporarily store information for the depacketizer 316. All of the above-identified units of the decoder 144 may be implemented on one or more circuit card assemblies. The circuit card assemblies may be installed in a self-contained enclosure that mounts on or adjacent to the projector 148. Additionally, a cryptographic smart card 328 may be used which interfaces with controlling CPU 312 and/or image decryptor/decompressor 320 for transfer and storage of unit-specific cryptographic keying information.

The depacketizer 316 identifies and separates the individual control, image, and audio packets that arrive from the playback module 140, the CPU 312 and/or the theater manager 128. Control packets may be sent to the theater manager 128 while the image and audio packets are sent to the image and audio decryption/decompression systems 320 and 324, respectively. Read and write operations tend to occur in bursts. Therefore, the buffer 314 is used to stream data smoothly from the depacketizer 316 to the projection equipment.

The theater manager 128 configures, manages the security of, operates, and monitors the theater subsystem 104. This includes the external interfaces, image and audio decryption/decompression modules 320 and 324, along with projector 148 and the sound system module 152. Control information comes from the playback module 140, the CPU 312, the theater manager system 128, a remote control port, or a local control input, such as a control panel on the outside of the auditorium module 132 housing or chassis. The decoder CPU 312 may also manage the electronic keys assigned to each auditorium module 132. Pre-selected electronic cryptographic keys assigned to auditorium module 132 are used in conjunction with the electronic cryptographic key information that is embedded in the image and audio data to decrypt the image and audio information before the decompression process. Preferably, the CPU 312 uses a standard microprocessor running embedded in the software of each auditorium module 132, as a basic functional or control element.

In addition, the CPU 312 is preferably configured to work or communicate certain information with theater manager 128 to maintain a history of presentations occurring in each auditorium. Information regarding this presentation history is then available for transfer to the hub 102 using the return link, or through a transportable medium at preselected times.

The image decryptor/decompressor 320 takes the image data stream from depacketizer 316, performs decryption, adds a watermark and reassembles the original image for presentation on the screen. The output of this operation generally provides standard analog RGB signals to digital cinema projector 148. Typically, decryption and decompression are performed in real-time, allowing for real-time playback of the programming material.

The image decryptor/decompressor 320 decrypts and decompresses the image data stream to reverse the operation performed by the image compressor 184 and the image encryptor 188 of the hub 102. Each auditorium module 132 may process and display a different program from other auditorium modules 132 in the same theater subsystem 104 or one or more auditorium modules 132 may process and display the same program simultaneously. Optionally, the same program may be displayed on multiple projectors, the multiple projectors being delayed in time relative to each other.

The decryption process uses previously provided unit-specific and program-specific electronic cryptographic key information in conjunction with the electronic keys embedded in the data stream to decrypt the image information. Each theater subsystem 104 is provided with the necessary cryptographic key information for all programs authorized to be shown on each auditorium module 132.

A multi-level cryptographic key manager is used to authorize specific presentation systems for display of specific programs. This multi-level key manager typically utilizes electronic key values which are specific to each authorized theater manager 128, the specific image and/or audio program, and/or a time varying cryptographic key sequence within the image and/or audio program. An "auditorium specific" electronic key, typically 56 bits or longer, is programmed into each auditorium module 132.

This programming may be implemented using several techniques to transfer and present the key information for use. For example, the return link discussed above may be used through a link to transfer the cryptographic information from the conditional access manager 124. Alternatively, smart card technology such as smart card 328, pre-programmed flash memory cards, and other known portable storage devices may be used.

For example, the smart card 328 may be designed so that this value, once loaded into the card, cannot be read from the smart card memory.

Physical and electronic security measures are used to prevent tampering with this key information and to detect attempted tampering or compromise. The key is stored in such a way that it can be erased in the event of detected tampering attempts. The smart card circuitry includes a microprocessor core including a software implementation of an encryption algorithm, typically Data Encryption Standard (DES). The smart card can input values provided to it, encrypt (or decrypt) these values using the on-card DES algorithm and the pre-stored auditorium specific key, and output the result. Alternatively, the smart card 328 may be used simply to transfer encrypted electronic keying information to circuitry in the theater subsystem 104 which would perform the processing of this key information for use by the image and audio decryption processes.

Image program data streams undergo dynamic image decompression using an inverse ABSDCT algorithm or other image decompression process symmetric to the image compression used in the central hub compressor/encryptor 112. If image compression is based on the ABSDCT algorithm the decompression process includes variable length decoding, inverse frequency weighting, inverse quantization, inverse differential quad-tree transformation, IDCT, and DCT block combiner deinterleaving. The processing elements used for decompression may be implemented in dedicated specialized hardware configured for this function such as an ASIC or one or more circuit card assemblies. Alternatively, the decompression processing elements may be implemented as standard elements or generalized hardware including a variety of digital signal processors or programmable electronic devices or computers that operate under the control of special function software or firmware programming. Multiple ASICs may be implemented to process the image information in parallel to support high image data rates.

Digital watermarks are applied to the image data before the image is output for display by the projector. The watermarks are applied by the image decryptor/decompressor 320 before the data is output to the projector 148 for display of the image that it represents.

Figure 4:
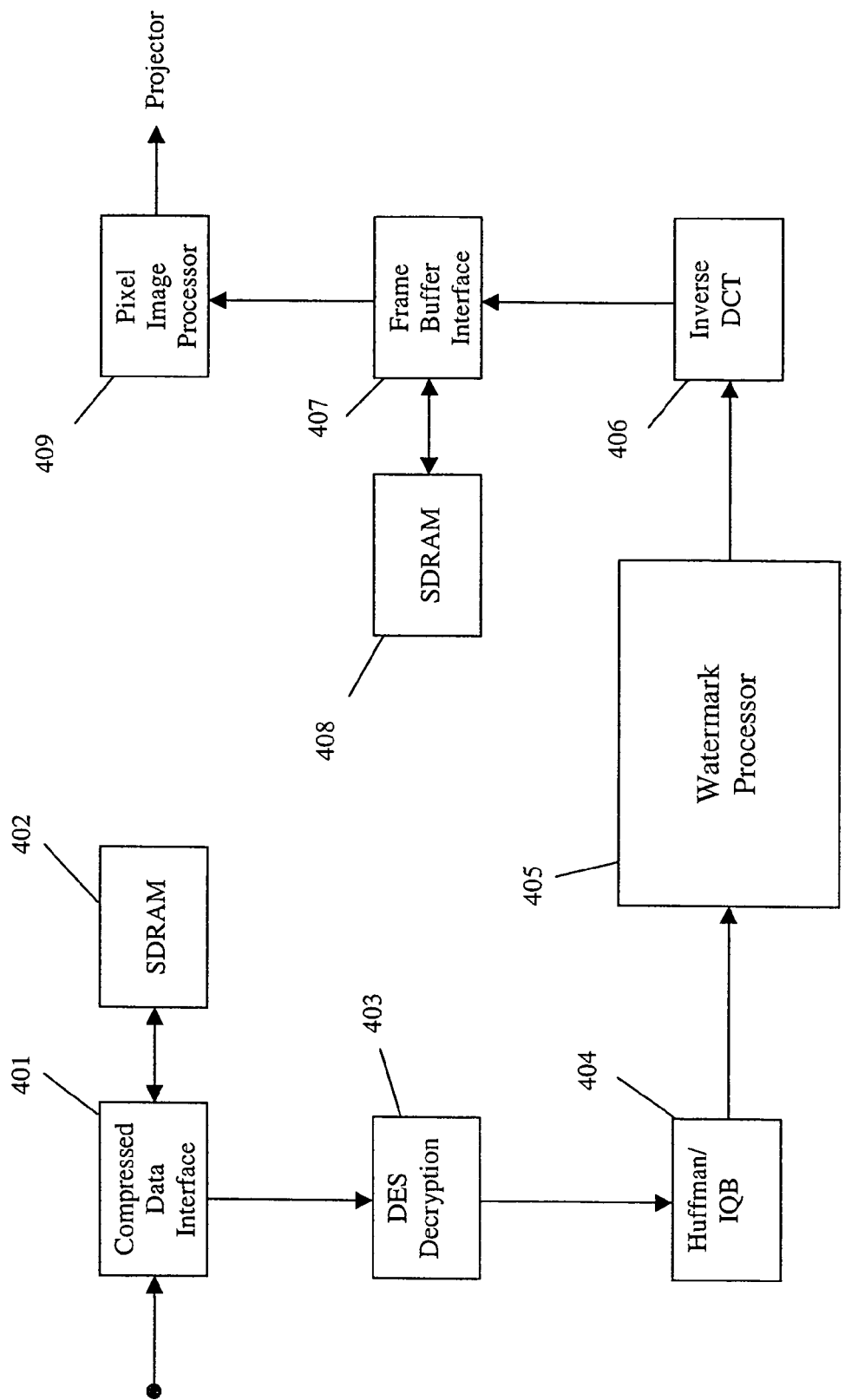
FIG. 4 is a block diagram representing parts of an encryption/decryption unit for applying watermarks to image data.

Referring now to FIG. 4 of the accompanying drawings, relevant parts of the decryptor/decompressor 320 for applying a watermark to the image are shown therein. The decryptor/decompressor 320 comprises a compressed data interface (CDI) 401, which receives the depacketised, compressed and encrypted data from the depacketiser 316 (see FIG. 3). Data tends to be moved around and processed in bursts, and so the received data is stored in a random access store 402, which is preferably an SDRAM device or similar, until it is needed. The data input to the SDRAM store 402 corresponds to compressed and encrypted versions of the image data. The store 402, therefore, need not be very large (relatively speaking) to be able to store data corresponding to a large number of image frames.

From time to time, the data is taken from the store 402 by the CDI 401 and output to a decryption circuit 403 where it is decrypted using a DES (Data Encryption Standard) key. The DES key is specific to the encryption performed at the central facility 102 (see FIG. 1) and, therefore, enables the incoming data to be decrypted. The data may also be compressed before it is transmitted from the central facility, using lossless techniques including Huffman or run-length encoding and/or lossy techniques including block quantization in which the value of the data in a block is divided by a power of 2 (i.e., 2 or 4 or 8, etc). The decryptor/decompressor 320 thus comprises a decompressor, e.g., an inverse quantization block (Huffman/IQB) decompressor 404 that decompresses the decrypted data. The decompressed data from the Huffman/IQB decompressor 404 represents the image data in the DCT domain.

Since the system already comprises the necessary hardware and software to effect DCT compression techniques, specifically the above-mentioned ABSDCT compression technique, to compress data, the same is used to embed a watermark into the picture in the DCT domain. Other transformations could, of course, be used but since the hardware is already there in the system this offers the most cost-effective solution.

Data from the decompressor 404 is, therefore, input to a watermark processor 405 where a watermark is applied in a manner that will be described in greater detail herein below. The data from the watermark processor 405 is then input to an inverse DCT transforming circuit 406 where the data is converted from the DCT domain into image data in the pixel domain.

The thus produced pixel data is input to a frame buffer interface 407 and associated SDRAM store 408. The frame buffer interface 407 and associated store 408 serves as a buffer in which the pixel data is held for reconstruction in a suitable format for display of the image by a pixel image processor 409. The SDRAM store 408 may be of a similar size to that of the SDRAM store 402 associated with the compressed data interface 401. However, since the data input to the frame buffer interface 407 represents the image in the pixel domain, data for only a comparatively small number of image frames can be stored in the SDRAM store 408. This is not a problem because the purpose of the frame buffer interface 407 is simply to reorder the data from the inverse DCT circuit and present it for reformatting by the pixel image processor 409 at the display rate.

The decompressed image data goes through digital to analog conversion, and the analog signals are output to projector 148 for display of the image represented by the image data. The projector 148 presents the electronic representation of a program on a screen. The high quality projector is based on advanced technology, such as liquid crystal light valve (LCLV) methods for processing optical or image information. The projector 148 receives an image signal from image decryptor/decompressor 320, typically in standard Red-Green-Blue (RGB) video signal format. Alternatively, a digital interface may be used to convey the decompressed digital image data to the projector 148 obviating the need for the digital-to-analog process. Information transfer for control and monitoring of the projector 148 is typically provided over a digital serial interface from the controller 312.

Figure 5:
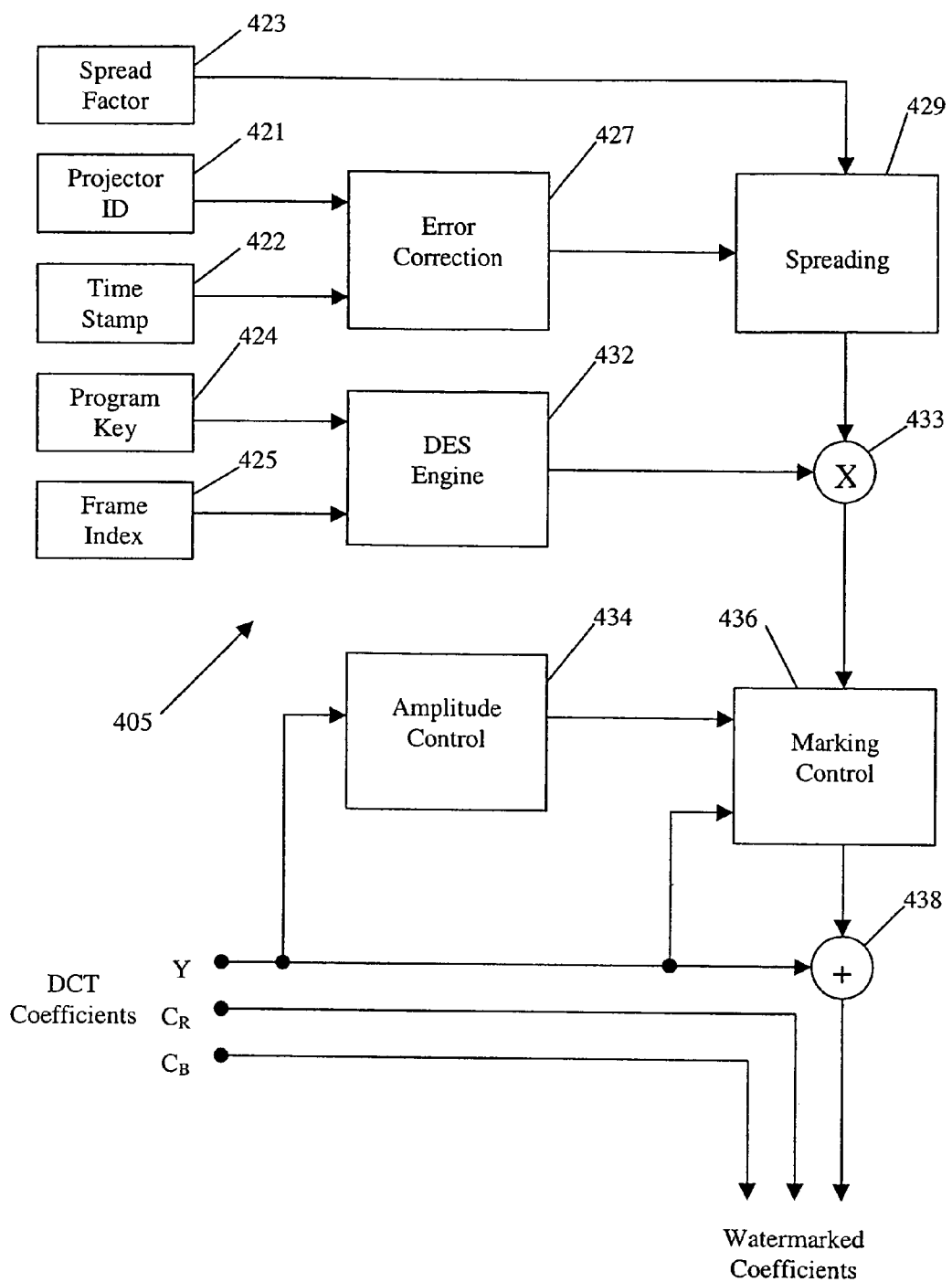
FIG. 5 is a block diagram representing a watermark unit of the encryption/decryption unit of FIG. 4.

FIG. 5 of the accompanying drawings shows the watermark processor 405 in greater detail. The watermark processor 405 is a configurable coefficient modulator in which registers store the watermark identification information and decisions are made on which reels to mark and how heavily.

The watermark processor 405 embeds an imperceptible projector identification code and time stamp into consecutive frames of video before the data is output to the projector for display. This identification coding is able to withstand basic image manipulations such as resolution scaling and cropping. More involved attacks, such as inter-frame averaging, collusion of segments from multiple sources, and image warping, are possible but beyond the resources of the casual video pirate. The watermarking information is inserted into the video data in such a way that all information contained in the watermark is readable during any contiguous segment of the motion image program of no more than five minutes in duration.

The watermark processor 405 employs a DES engine that is keyed to the program key. This serves three purposes. Firstly, the watermark pattern cannot be predicted because the sequence is tied to a non-linear noise generator. Secondly, the watermark is specific to the individual program and ensures the pirate cannot tamper with it, despite having compromised another program or being aware of the watermark technique. Thirdly, the watermark is imperceptible because it is masked in a noise-like random sequence, i.e., the code generated by the DES engine.

It is assumed that a video pirate will know that the movie material he is stealing will contain a watermark of some origin. He may not be able to perceive it or strip it from the image, but he may be able to alter it using some or all of the following methods.

Basic manipulations such as resolution scaling and cropping occur when the program is recorded onto a video camera or similar device. The digital cinema display format can be as large as 2560×1088; most consumer equipment is limited to a maximum of 800×600 pixels (SVHS). This implies a resolution scaling operation and possibly also a cropping operation. The video pirate may decide to capture the entire width of the image (letterbox format) or a fraction of it (pan and scan).

Complex manipulations such as inter-frame averaging occur when two video frames from the same scene are used to average out the areas that have been watermarked. One form of this inter-frame averaging could occur when the charge-coupled device (CCD) in a video camera converts the 24 or 30 fps of the projector into its internal refresh rate.

Another complex manipulation attack can occur when the same program sequence is captured from different projectors with different watermark identification codes. The sets of frames can be compared to identify which portions of a frame are marked and average those out. A variation on this scheme, collusion, uses two copies of the program to identify marked portions and then modifies them to fabricate a false signature of a third copy. A further complex manipulation, image warping, involves using a geometric transformation on every frame. Under this scheme, image bits are moved slightly to new positions so that the image appears untouched, but the watermark detector cannot locate the bits.

The watermark processor 405 comprises a number of registers 421 to 425 that hold variables used in the watermarking process. Registers 421 and 422 hold data respectively identifying the projector (which one and in which theatre) and the time of display of the program. The projector identity data and the time stamp data are input to an error correction unit 427 where forward error correction, i.e., convolutional coding, is applied. The error corrected data from the correction unit 427 is input to a spreading block 429 together with a spreading factor from the register 423. The spreading block 429 spreads the bits from the correction unit 427 so as to make the watermarking data more robust against short-period manipulations. The spreading function performed by the spreading block 429 may, for example, duplicate each input bit a number of times before moving on to the next bit. This enables the data to be spread within a frame with the code changing on a frame-by-frame basis, or to be spread over several frames with the code changing after a predetermined number of frames.

The watermark processor 405 also comprises a DES engine 432. The DES engine 432 generates DES codes entirely independently of the DES codes used by the DES decryption unit 403 (see FIG. 4). The DES key used by the DES decryption unit 403 pertains to the encryption and decryption of the data from the central facility (see FIG. 1) whereas the DES key generated by the DES engine 432 is specific to the theater and/or the projector I which the movie is displayed.

The DES engine 432 is used to generate a pseudo-random noise (PN) sequence for embedding the watermark data into the movie bits. A program key is loaded from register 424 into the DES engine 432 at the start of the program and used throughout the program. At the beginning of each frame, the initial vector is loaded with the current frame number. The DES engine 432 is configured in output feedback mode. In this manner, a long-period PN sequence is generated that is unique for every frame of every program. The thus generated long PN sequence is output to an exclusive-OR (XOR) combiner 433 where it is combined on a bit-by-bit basis with the data from the spreading block 429.

An amplitude control block 434 identifies the level at which each DCT coefficient is marked. Amplitude control is accomplished by determining the magnitude of each DCT coefficient and using the magnitude of the DCT coefficients to index data in a look-up table. The magnitude of the coefficient is determined as $\log_2$ of the absolute coefficient value. The DCT transform domain has the advantage that watermarks are adaptable because the strength of the watermark depends on the intensity values of the DCT coefficients of the original image. The watermark is made strong in the DCT coefficients with large intensity values and is attenuated in areas with small DCT values.

Although any color component may be used, FIG. 5 illustrates only DCT coefficients for the luminance (Y) component of the image are input to the amplitude control block 434 (and indeed to the watermark processor 405). In this embodiment, the DCT coefficients relating to the color different components ($C_R$ and $C_B$) of the image bypass the watermark processor 405 entirely. This is because the color difference components ($C_R$ and $C_B$) by themselves cannot be used to produce a meaningful image but the luminance (Y) component may be used to create a black-and-white version of the image. Processing the DCT coefficients for the Y component reduces processing overheads. In another embodiment, the $C_R$ and/or $C_B$ components are input to the watermark processor.

The amplitude control block 434 produces an amplitude value that is passed to a marking control block 436. The marking control block 436 controls the actual selection of the components to mark. It decides which DCT coefficients are marked and in what types of sub-blocks. Any block size (16×16, 8×8, 4×4, 2×2) may be marked, whether the block is deemed perceptually significant or not. In an embodiment, both perceptually significant and other blocks are marked. In another embodiment, perceptually significant blocks are not marked. The marking control block 436 converts the watermark value from the XOR combiner 433 into a negative value (−1) if the watermark bit is a zero (0) and into a positive value (+1) if the watermark bit is a one (1). The marking control block 436 also decides whether or not the watermark data will actually be incorporated into the DCT coefficients for the luminance component. To this end the marking control block examines the value of the coefficient and/or the amplitude value from the amplitude control block together with other information (including block size) pertaining to the DCT coefficients. Generally, watermarking is not applied to coefficients whose $\log_2$ value is zero since this may introduce a noise into the image. Such noise would probably be visible in the image and is therefore unacceptable. When watermarking is to be applied the positive (+1) or negative (−1) value is added to the luminance (Y) data.

The data output from the marking control block 436 are input to an adder 438 where they are added to the DCT coefficients for the luminance component of the image. In this way, the watermark data is applied to the image data while still in the DCT domain. Apart from the DC components, all DCT coefficients are considered as candidates for the application of watermark data. The data is applied depending on among other things the amplitude of a coefficient. The application of watermarking data to a DCT coefficient will have an effect on an area in the image since each DCT coefficient contributes to several pixels in the image. It follows, therefore, that the watermarking is applied to substantially the whole of the image and not just selected portions of it. This tends to make the watermarking more robust to such attacks as those discussed herein above.

Those possessed of the appropriate skills will appreciate from the foregoing that the watermark is constructed to indicate the authorized location and time for presentation, for more efficiently tracking the source of illicit copying when necessary. The watermark may appear at frequent, but deterministic periods in the playback process and is not visible to the viewing audience. The watermark is perceptually unnoticeable during presentation of decompressed image or audio information at what is predefined as a normal rate of transfer. However, the watermark may be detectable, although not perceptible, when the image or audio information is presented at a rate substantially different from that normal rate, such as at a slower "non-real-time" or still frame playback rate. If an unauthorized copy of a program is recovered, the digital watermark information can be read by authorities, and the theater from which the copy was made can be determined.

The watermarked DCT data thus produced by the watermarking processor 405 is input to the inverse DCT unit 406 where it is converted into pixel data as has already been explained herein with reference to FIG. 4. Thus, the decryptor/decompressor 320 serves to decrypt the incoming data, decompress it, apply a watermark, convert the data from the DCT domain to the pixel domain and reconstruct the pixels into a suitable format for display of the image by the projector 148.

The audio decryptor/decompressor 324 shown in FIG. 3 operates in a similar manner on the audio data, although it does not apply data representing a watermark or fingerprint to the audio signal. Of course such a watermark technique may also be applied or used to identify the audio programs, if desired. The audio decryptor/decompressor 324 takes the audio data stream from the depacketizer 316, performs decryption, and reassembles the original audio for presentation on a theater's speakers or audio sound system 152. The output of this operation provides standard line level audio signals to the sound system 152.

Similar to the image decryptor/decompressor 320, the audio decryptor/decompressor 324 reverses the operation performed by the audio compressor 192 and the audio encryptor 196 of the hub 102. Using electronic keys from the cryptographic smart card 328 in conjunction with the electronic keys embedded in the data stream, the decryptor 324 decrypts the audio information. The decrypted audio data is then decompressed.

Audio decompression is performed with an algorithm symmetric to that used at the central hub 102 for audio compression. Multiple audio channels, if present, are decompressed. The number of audio channels is dependent on the multi-phonic sound system design of the particular auditorium, or presentation system. Additional audio channels may be transmitted from the central hub 102 for enhanced audio programming for purposes such as multi-language audio tracks and audio cues for sight impaired audiences. The system may also provide additional data tracks synchronized to the image programs for purposes such as multimedia special effects tracks, subtitling, and special visual cue tracks for hearing impaired audiences.

As discussed earlier, audio and data tracks may be time synchronized to the image programs or may be presented asynchronously without direct time synchronization. Image programs may consist of single frames (i.e., still images), a sequence of single frame still images, or motion image sequences of short or long duration.

If necessary, the audio channels are provided to an audio delay element, which inserts a delay as needed to synchronize the audio with the appropriate image frame. Each channel then goes through a digital to analog conversion to provide what are known as "line level" outputs to sound system 152. That is, the appropriate analog level or format signals are generated from the digital data to drive the appropriate sound system. The line level audio outputs typically use standard XLR or AES/EBU connectors found in most theater sound systems.

Referring back to FIG. 3, the decoder chassis 144 includes a fiber channel interface 288, the depacketizer 316, the decoder controller or CPU 312, the image decryptor/decompressor 320, the audio decryptor/decompressor 324, and the cryptographic smart card 328. The decoder chassis 144 is a secure, self-contained chassis that also houses the encryption smart card 328 interface, internal power supply and/or regulation, cooling fans (as necessary), local control panel, and external interfaces. The local control panel may use any of various known input devices such as a membrane switch flat panel with embedded LED indicators. The local control panel typically uses or forms part of a hinged access door to allow entry into the chassis interior for service or maintenance. This door has a secure lock to prevent unauthorized entry, theft, or tampering of the system. During installation, the smart card 328 containing the encryption keying information (the auditorium specific key) is installed inside the decoder chassis 144, secured behind the locked front panel. The cryptographic smart card slot is accessible only inside the secured front panel. The YIQ signal output from the image decryptor/decompressor 320 to the projector 148 is connected securely within the decoder chassis 144 in such a way that the YIQ signals cannot be accessed while the decoder chassis 144 is mounted to the projector housing. Security interlocks may be used to prevent operation of the decoder 144 when it is not correctly installed to the projector 148.

The sound system 152 presents the audio portion of a program on the theater's speakers. Preferably, the sound system 152 receives up to 12 channels of standard format audio signals, either in digital or analog format, from the audio decryptor/decompressor 324.

Alternatively, the playback module 140 and the decoder 144 may be integrated into a single playback-decoder unit 132. Combining the playback module 140 and the decoder module 148 results in cost and access time savings in that only a single CPU (292 or 312) is needed to serve the functions of both the playback module 140 and the decoder

144. Combination of the playback module 140 and the decoder 144 also does not require the use of a fiber channel interface 288.

If multiple viewing locations are desired, information on any storage device 136 is configured to transfer compressed information of a single image program to different auditoriums with preselected programmable offsets or delays in time relative to each other. These preselected programmable offsets are made substantially equal to zero or very small when a single image program is to be presented to selected multiple auditoriums substantially simultaneously. At other times, these offsets can be set anywhere from a few minutes to several hours, depending on the storage configuration and capacity, in order to provide very flexible presentation scheduling. This allows a theater complex to better address market demands for presentation events such as first run films.

Figure 6:
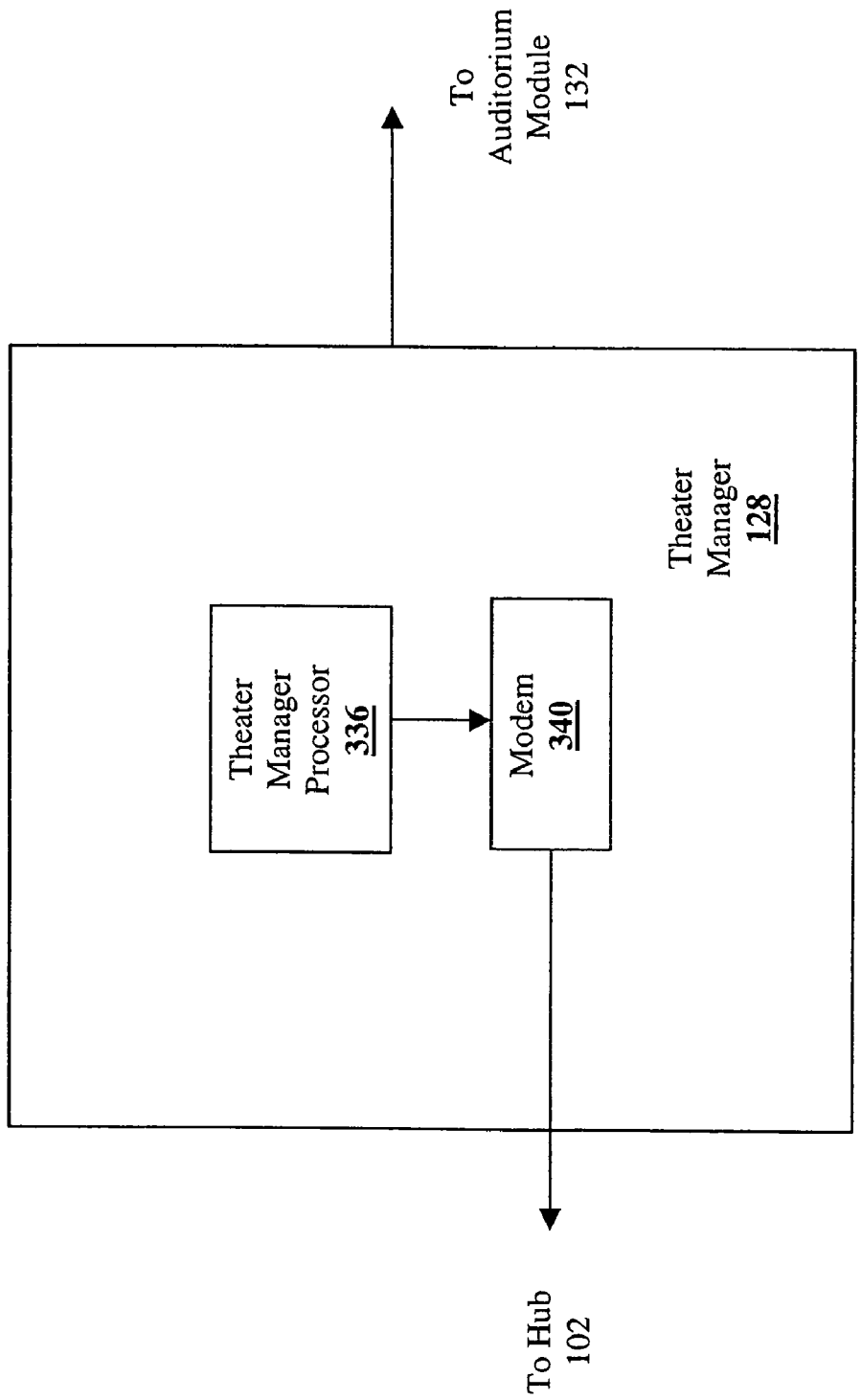
FIG. 6 is a block diagram representing a theater manager and its associated interfaces used in the system of FIG. 1.

The theater manager 128 is illustrated in greater detail in FIG. 6 of the accompanying drawings. Turning now to FIG. 6, the theater manager 128 provides operational control and monitoring of the entire presentation or theater subsystem 104, or one or more auditorium modules 132 within a theater complex. The theater manager 128 may also use a program control means or mechanism for creating program sets from one or more received individual image and audio programs, which are scheduled for presentation on an auditorium system during an authorized interval.

The theater manager 128 comprises a theater manager processor 336 and may optionally contain at least one modem 340, or other device that interfaces with a return link, for sending messages back to central hub 102. The theater manager 128 may include a visual display element such as a monitor and a user interface device such as a keyboard, which may reside in a theater complex manager's office, ticket booth, or any other suitable location that is convenient for theater operations.

The theater manager processor 336 is generally a standard commercial or business grade computer. The theater manager processor 336 communicates with the network manager 120 and conditional access manager 124 (see FIG. 1). Preferably, the modem 340 is used to communicate with the central hub 102. The modem 340 is generally a standard phone line modem that resides in or is connected to the processor, and connects to a standard two-wire telephone line to communicate back to the central hub 102. Alternatively, communications between the theater manager processor 336 and the central hub 102 may be sent using other low data rate communications methods such as Internet, private or public data networking, wireless, or satellite communication systems. For these alternatives, the modem 340 is configured to provide the appropriate interface structure.

The theater manager 128 allows each auditorium module 132 to communicate with each storage device 136. A theater management module interface may include a buffer memory such that information bursts may be transferred at high data rates from the theater storage device 136 using the theater manager interface 126 and processed at slower rates by other elements of the auditorium module 132.

Information communicated between the theater manager 128 and the network manager 120 and/or the conditional access manager 124 include requests for retransmission of portions of information received by the theater subsystem 104 that exhibiting uncorrectable bit errors, monitor and control information, operations reports and alarms, and cryptographic keying information. Messages communicated may be cryptographically protected to provide eavesdropping type security and/or verification and authentication.

The theater manager 128 may be configured to provide fully automatic operation of the presentation system, including control of the playback/display, security, and network management functions. The theater manager 128 may also provide control of peripheral theater functions such as ticket reservations and sales, concession operations, and environmental control. Alternatively, manual intervention may be used to supplement control of some of the theater operations. The theater manager 128 may also interface with certain existing control automation systems in the theater complex for control or adjustment of these functions. The system to be used will depend on the available technology and the needs of the particular theater, as would be known.

Through either control of theater manager 128 or the network manager 120, the invention generally supports simultaneous playback and display of recorded programming on multiple display projectors. Furthermore, under control of theater manager 128 or the network manager 120, authorization of a program for playback multiple times can often be done even though theater subsystem 104 only needs to receive the programming once. Security management may control the period of time and/or the number of playbacks that are allowed for each program.

Through automated control of the theater manager 128 by the network management module 112, a means is provided for automatically storing, and presenting programs. In addition, there is the ability to control certain preselected network operations from a location remote from the central facility using a control element. For example, a television or film studio could automate and control the distribution of films or other presentations from a central location, such as a studio office, and make almost immediate changes to presentations to account for rapid changes in market demand, or reaction to presentations, or for other reason understood in the art.

The theater subsystem 104 may be connected with the auditorium module 132 using a theater interface network (not shown). The theater interface network comprises a local area network (electric or optical) which provides for local routing of programming at the theater subsystem 104. The programs are stored in each storage device 136 and are routed through the theater interface network to one or more of the auditorium system(s) 132 of the theater subsystem 104. The theater interface network 126 may be implemented using any of a number of standard local area network architectures which exhibit adequate data transfer rates, connectivity, and reliability such as arbitrated loop, switched, or hub-oriented networks.

Each storage device 136, as shown in FIG. 1, provides for local storage of the programming material that it is authorized to playback and display. The storage system may be centralized at each theater system. In this case the theater storage device 136 allows the theater subsystem 104 to create presentation events in one or more auditoriums and may be shared across several auditoriums at one time.

Depending upon capacity, the theater storage device 136 may store several programs at a time. The theater storage device 136 may be connected using a local area network in such a way that any program may be played back and presented on any authorized presentation system (i.e., projector). Also, the same program may be simultaneously played back on two or more presentation systems.

Having thus described the invention by reference to a preferred embodiment it is to be well understood that the embodiment in question is exemplary only and that modi- fications and variations such as will occur to those possessed of appropriate knowledge and skills may be made without departure from the spirit and scope of the invention as set forth in the appended claims and equivalents thereof.

What we claim as our invention is:

1. An apparatus for adding a watermark to a moving image as it is displayed, the apparatus comprising:
a watermark generator in which data representing a watermark is generated containing first information pertaining to the displaying of the moving image and protected by forward error encoding and second information pertaining to the displaying of the moving image and protected by scrambling; and
a watermark applicator for applying the watermark data to image data representing substantially all of the moving image depending on a characteristic of the data,
wherein the watermark generator is connected to receive at least one of program data identifying the moving image and frame data unique in identifying a predetermined number of frames of the moving image as said second information pertaining to the displaying of the image.

2. The apparatus as claimed in claim 1, wherein the watermark generator is connected to receive at least one of location data and time data as said first information pertaining to the displaying of the image.

3. The apparatus as claimed in claim 1, wherein the predetermined number of frames of the moving image includes each frame of the moving image.

4. The apparatus as claimed in claim 3, wherein the watermark generator is connected to receive at least one of location data and time data as said first information pertaining to the displaying of the image.

5. The apparatus as claimed in claim 1, wherein the watermark generator comprises an error correcting circuit for receiving said first information pertaining to the displaying of the image and applying said forward error encoding.

6. The apparatus as claimed in claim 1, wherein the watermark generator comprises a DES engine for receiving said second information pertaining to the displaying of the image and scrambling the same by generating a pseudo-random code depending on the second information.

7. The apparatus as claimed in claim 1, wherein the watermark applicator comprises an amplitude control module for controlling application of the watermark data to the image data depending on the amplitude of the image data.

8. The apparatus as claimed in claim 1, wherein the watermark applicator comprises an adder for adding the watermark data to the image data.

9. A method for adding a watermark to a moving image as it is displayed, the method comprising:
generating data representing the watermark, wherein the data contains first information pertaining to the displaying of the moving image that is protected by forward error encoding and second information pertaining to the displaying of the moving image that is protected by scrambling; and
applying the watermark data to image data representing substantially all of the moving image depending on a characteristic of the data,
wherein the second information includes at least one of program data, which identifies the moving image, and frame data, which is unique in identifying a predetermined number of frames of the moving image.

10. The method as claimed in claim 9, wherein the first information includes at least one of location data and time data.

11. The method as claimed in claim 9, wherein the predetermined number of frames of the moving image includes each frame of the moving image.

12. The method as claimed in claim 11, wherein the first information includes at least one of location data and time data.

13. An apparatus for adding a watermark to a moving image as it is displayed, the method comprising:
means for generating data representing the watermark, wherein the data contains first information pertaining to the displaying of the moving image that is protected by forward error encoding and second information pertaining to the displaying of the moving image that is protected by scrambling; and
means for applying the watermark data to image data representing substantially all of the moving image depending on a characteristic of the data,
wherein the second information includes at least one of program data, which identifies the moving image, and frame data, which is unique in identifying a predetermined number of frames of the moving image.

14. The apparatus as claimed in claim 13, wherein the first information includes at least one of location data and time data.

15. The apparatus as claimed in claim 13, wherein the predetermined number of frames of the moving image includes each frame of the moving image.

16. The apparatus as claimed in claim 15, wherein the first information includes at least.

* * * * *

UNITED STATES PATENT AND TRADEMARK OFFICE
CERTIFICATE OF CORRECTION

PATENT NO. : 7,376,243 B2 Page 1 of 1
APPLICATION NO. : 11/341098
DATED : May 20, 2008
INVENTOR(S) : Brian Fudge, Kadayam Thyagarajan and Eric Rosen It is certified that error appears in the above-identified patent and that said Letters Patent is hereby corrected as shown below:

Column 22, lines 46 and 47,
Claim 16 should be completed to read as follows:

16. The apparatus as claimed in claim 15, wherein the first information includes as least one of location data and time data.

Signed and Sealed this

Third Day of March, 2009

JOHN DOLL
*Acting Director of the United States Patent and Trademark Office*